United States Patent [19]
Clerc

[11] Patent Number: 5,182,664
[45] Date of Patent: Jan. 26, 1993

[54] LIQUID CRYSTAL DISPLAY HAVING ELECTRICALLY CONTROLLED BIREFRINGENCE

[75] Inventor: Jean-Frédéric Clerc, Tokyo, Japan

[73] Assignee: Stanley Electric Co., Ltd., Tokyo, Japan

[21] Appl. No.: 629,488

[22] Filed: Dec. 18, 1990

[30] Foreign Application Priority Data

Dec. 21, 1989 [JP] Japan ............................. 1-332339

[51] Int. Cl.⁵ .............................................. G02F 1/13
[52] U.S. Cl. .................................... 359/93; 359/55; 359/63; 359/77
[58] Field of Search ............... 350/337, 340, 349, 346, 350/347 E; 359/93, 77, 54, 55, 63; 340/784 D, 784 E

[56] References Cited

U.S. PATENT DOCUMENTS

| | | | |
|---|---|---|---|
| 3,914,022 | 10/1975 | Kashnow | 359/77 |
| 4,062,626 | 12/1977 | Kawakami et al. | 340/784 D |
| 4,357,374 | 11/1982 | Ogawa | 350/340 |
| 4,413,256 | 11/1983 | Yasuda et al. | 359/63 |
| 4,527,864 | 7/1985 | Dir | 350/337 |
| 4,701,028 | 10/1987 | Clerc et al. | 350/337 |
| 4,735,492 | 4/1988 | Sekine et al. | 350/340 |
| 4,759,612 | 7/1988 | Nakatsuka et al. | 350/337 |
| 4,786,147 | 11/1988 | Clerc et al. | 350/340 |
| 4,923,286 | 5/1990 | Grupp | 350/340 |
| 4,974,940 | 12/1990 | Asano et al. | 350/337 |

FOREIGN PATENT DOCUMENTS

| | | | |
|---|---|---|---|
| 0173608A1 | 5/1986 | European Pat. Off. | 359/93 |
| 0421432A1 | 4/1991 | European Pat. Off. | 359/93 |
| 2416519 | 8/1979 | France | 359/93 |
| 52-29753 | 3/1977 | Japan | 350/340 |
| 57-108830 | 7/1982 | Japan | 350/340 |
| 59-91421 | 5/1984 | Japan | 359/55 |
| 61-219023 | 9/1986 | Japan | 359/55 |

OTHER PUBLICATIONS

J. Duchenne, "Multiplexed liquid crystal matrix displays", Jan. 1986, pp. 3–11, Displays.
L. A. Goodman, "Liquid Displays–Electro-Optic Effects and Addressing Techniques", Dec. 1974, pp. 613–651, RCA Laboratories.

Primary Examiner—Rolf Hille
Assistant Examiner—Minhloan Tran
Attorney, Agent, or Firm—Frishauf, Holtz, Goodman & Woodward

[57] ABSTRACT

Disclosed is a homeotropic liquid crystal display which comprises a pair of substrates and a nematic liquid crystal layer disposed between the pair of substrate to form a cell. The substrates have tilt orientation directions parallel to each other which are capable of orientating liquid crystal molecules homeotropically or pseudo-homeotropically at an angle range of from 0° to about 20°. The nematic liquid crystal layer has negative dielectric anistropy and contains no or a very small amount of chiral molecules. The cell has a response time shorter than the driving frame time, and a small gap and low viscosity so that the liquid crystal layer is not twisted at an "OFF" state but is spontaneously twisted only in an "ON" state in which a pulse voltage is applied to the cell.

7 Claims, 4 Drawing Sheets

"OFF"

"ON"

LIQUID CRYSTAL DISPLAY HAVING ELECTRICALLY CONTROLLED BIREFRINGENCE

BACKGROUND OF THE INVENTION a) Field of the Invention

The present invention relates to a liquid crystal display and a method of driving the same, and more particularly relates to a field-control nematic liquid crystal display including a liquid crystal cell disposed between a pair of polarizers and a method of driving the same.

b) Description of the Related Art

Heretofore, the following two types of electrooptic effect devices are known in the case of observing a nematic liquid crystal cell disposed between a pair of polarizers under electrical control.

First Type: Twisted Nematic Type

Second Type: Electrically Controlled Birefringence type

In the following, the electrooptic effect devices of these two types are described with reference to FIGS. 2A and 2B.

FIG. 2A shows a conventional twisted nematic liquid crystal display. In FIG. 2A, the left part expresses an "OFF" state and the right part expresses an "ON" state. In the "OFF" state, the liquid crystal layer is in a twisted state. The twisting of the liquid crystal layer can be obtained by arranging a pair of substrates 21 and 22 to be in a twisted state and arranging liquid crystal molecules 23 adjacent to the substrates 21 and 22 to be in the non-parallel axial directions. The liquid crystal cell as shown in FIG. 2A has a twist angle of 90°. Further, there is also known a so-called supertwisted nematic liquid crystal display using a larger twist angle. In FIG. 2A, the arrow shows an axial direction of dielectric anisotropy. In this case, the dielectric anisotropy of the liquid crystals is positive.

In the "ON" state, a voltage is applied between the substrates 21 and 22. The direction of liquid crystal molecules 23 at the intermediate portion of the liquid crystal layer apart from the substrates 21 and 22 is changed toward the direction of the electric field by this voltage application. In short, in the "ON" state, the liquid crystal molecules 23 are twisted and tilted. The tilt angle can be controlled electrically.

In the following, the operation of the twisted nematic type liquid crystal display is described. In the "OFF" state, the liquid crystal cell serves as a waveguide. Polarized light causes rotation of the polarization axis along with the twisted liquid crystal layer. In the case where the first and second polarizers 25 and 26 provided on opposite sides of the cell have parallel polarization axes P1 and P2 and the polarization axis P1 of the first polarizer 25 is arranged in the X-direction to be parallel to the direction of orientation of the liquid crystals, light transmitted through the first polarizer 25 enters into the liquid crystal layer and is rotated to form Y-direction polarized light. The Y-direction polarized light is entirely absorbed by the second polarizer 26 having the X-direction polarization axis P2.

In the "ON" state, the waveguide effect of the liquid crystal layer is lost by tilting the liquid crystal molecules. As the liquid crystal molecules in the cell are tilted more intensively, the transmittance of the cell increases.

As described above, the "OFF" state in which light is not transmitted and the "ON" state in which light is transmitted can be obtained.

FIG. 2B shows an electrically controlled birefringence type liquid crystal display. The liquid crystal cell is arranged between first and second polarizers 30 and 31. For example, the first polarizer 30 has a polarization axis P1 in the X-direction and the second polarizer 31 has a polarization axis P2 in the Y-direction perpendicularly crossing the X-direction. The liquid crystal molecules 29 have negative dielectric anisotropy. In FIG. 2B, the left part expresses an "OFF" state and the right part expresses an "ON" state.

In the "OFF" state, the liquid crystal molecules 29 are in a homeotropic state in which they are perpendicular to the substrates 27 and 28. When a voltage is applied between the substrates 27 and 28, the liquid crystal molecules 29 are tilted according to the negative dielectric anisotropy. Accordingly, the "ON" state exhibits a tilt state.

In the "OFF" state, the liquid crystal cell has no optical effect on incident light. Because the liquid crystal cell is arranged between the crossed polarizers, the incident light is absorbed by the crossed polarizers 30 and 31. These polarizers 30 and 31 may be constituted by linear polarizers or may be constituted by circular polarizers.

In the "ON" state, the liquid crystal cell exhibits the effect of birefringence. In the case of using crossed linear polarizers, the maximum value of transmittance can be obtained when angles of ±45° are formed between the tilt direction of the liquid crystal molecules 29 and the polarization axes of the polarizers 30 and 31. In the case of using circular polarizers, the maximum value of transmittance can be obtained at the middle of the respective polarizer. In the case of using crossed linear polarizers, the effect of birefringence is lost when one of the polarizers is aligned with the tilt direction of the liquid crystal molecules.

In either case of the twisted nematic type and the electrically controlled birefringence type, the tilting of the liquid crystal molecules is controlled by the electric field.

In the aforementioned liquid crystal display, the impressed electric field has no relation to the twisting of the liquid crystal layer. In the case of the twisted nematic type, the twisting exists not only in the "ON" state but in the "OFF" state. In the case of the electrically controlled birefringence type, the twisting exists neither in the "OFF" state nor in the "ON" state.

SUMMARY OF THE INVENTION

An object of the present invention is to provide a novel nematic liquid crystal display.

Another object of the invention is to provide a method of driving the novel nematic liquid crystal display.

According to an aspect of the invention, a nematic liquid crystal layer having negative dielectric anisotropy is disposed between a pair of substrates having tilt orientation directions parallel to each other. The liquid crystal layer exhibits homeotropic orientation or pseudo-homeotropic orientation in an angle range of from 0° to about 20°. The liquid crystal layer contains no or only contains a very small amount of chiral molecules.

The aforementioned liquid crystal cell is disposed between a pair of parallel polarizers.

In the "OFF" state, a constant voltage is applied to the liquid crystal display. In the "ON" state, a pulse voltage is applied to the liquid crystal display.

When the liquid crystal molecules in the liquid crystal display are kept in homeotropically parallel orientation, the liquid crystal molecules have no electrooptic effect so that light transmitted through the liquid crystal cell is diminished to zero by disposing the crossed polarizers.

Optical birefringence is obtained by applying a pulse voltage to the liquid crystal display, because the liquid crystal layer is twisted spontaneously by the application of the pulse voltage. As a result, light transmission arises through the liquid crystal display sandwiched between the crossed polarizers.

In the "OFF" state, the "OFF" state can be secured by applying a constant voltage to the liquid crystal display. In the "ON" state, the liquid crystal layer can be twisted by applying a pulse voltage to the liquid crystal display to thereby bring about optical birefringence to thereby obtain light transmission.

Figure 1A:
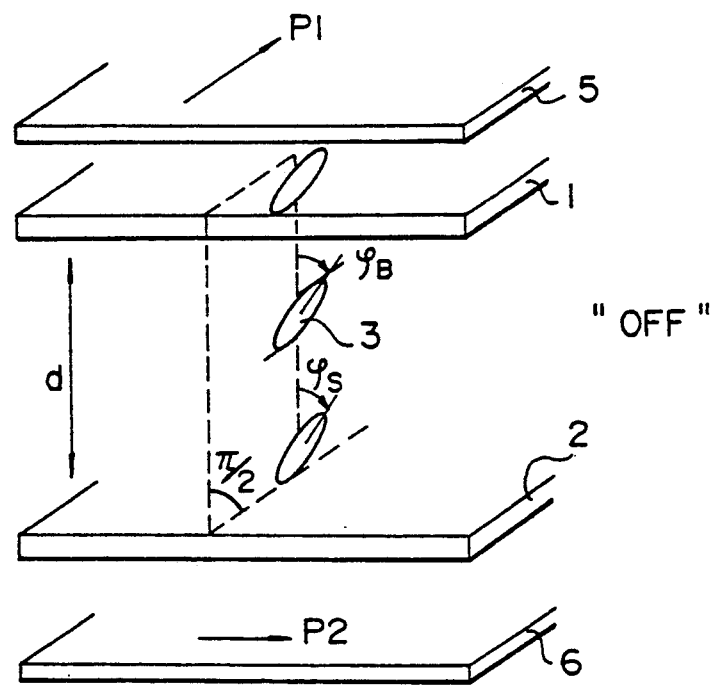
FIGS. 1A and 1B are schematic perspective views respectively showing the "OFF" state and the "ON" state of a liquid crystal display according to an embodiment of the present invention.

In the drawings, reference numerals represent the following parts: 1, 2 . . . substrate; 3 . . . liquid crystal molecule; 5, 6 . . . polarizer; 21, 22, 27, 28 . . . substrate; 23, 29 . . . liquid crystal molecule; 25, 26, 30, 31 . . . polarizer.

DESCRIPTION OF THE PREFERRED EMBODIMENTS

In the embodiment of the present invention which will be described below, a cell not having chiral properties is formed by using pure nematic liquid crystals. The pure nematic liquid crystals used herein contain no cholesteric impurity. The cell not having chiral properties means a cell having mirror symmetry with respect to the cell. The substrates of the cell have the same tilt with the same amplitude and the same direction and do not have chiral properties. In the "OFF" state, the liquid crystal molecules have homogeneous orientation on a common plane.

It has been found that the pure nematic liquid crystals are twisted spontaneously by application of the electric field.

Here, the direction of the liquid crystal molecules is approximately parallel to the normal to the substrate (homeotropic or pseudo-homeotropic state).

In general, the response time of the cell based on electric excitation is shorter than the frame time for displaying an image.

The excitation signal is constituted by at least one pulse signal having sufficient amplitude and time length to move the liquid crystal molecules within the cell.

Further, the inventor has found that the state in which the liquid crystals are not twisted can be stabilized by applying an electric signal having constant amplitude (average value of the square thereof), e.g. by applying a certain bias voltage, to the liquid crystal molecules. In short, the liquid crystal molecules can be aligned only in the symmetric plane of the cell.

A flow state is a factor for giving spontaneous twisting to the liquid crystal molecules having no chiral property.

When a periodic pulse signal is applied to the liquid crystal molecules, tilting occurs periodically in the liquid crystal molecules. The tilting of the molecules occurs in the vicinity of the normal line of the cell and brings about an intensive flow parallel to the substrate. The flow is classified into two groups. One is a flow at an upper half of the cell, and the other is a flow at a lower half of the cell. These flows are anti-parallel to each other, so that shear torque is produced. The shear torque determines electrically controlled twist. A mechanism for stabilizing the non-twisted state is known for a long time. The higher the tilting becomes, the higher the energy of twisting becomes.

Figure 1B:
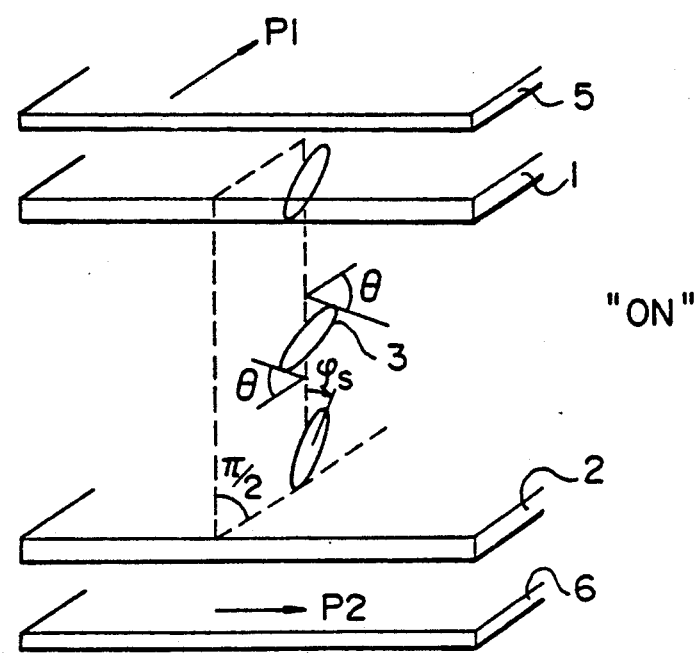

FIGS. 1A and 1B are schematic perspective views respectively showing the "OFF" state and the "ON" state of a liquid crystal display according to an embodiment of the present invention.

The state of orientation of the liquid crystal molecules is homeotropic or pseudo-homeotropic.

Each of the tilt angles $\phi_S$ on the surfaces of the substrates 1 and 2 is within a range of about 1° to about 30°C. The aforementioned surface tilt is provided by the following method.

First Step: Preparation of Underline Layer

An underlie layer is made of a polymer material (e.g. polyimide) or a mineral (e.g. $SiO_2$).

Anisotropic treatment is applied to the underlie layer. In short, rubbing treatment or oblique evaporating treatment is carried out on the substrates.

Second Step: Homeotropic Orientation

A material such as poly-silane is adsorbed on the anisotropic underlie layer prepared as described above. It is known that the adsorption of poly-silane provides surface tilt from 0° to 30°.

In the "OFF" state, all liquid crystal molecules 3 in the cell are parallel to the mirror symmetry plane of the cell containing the tilt directions of the substrates 1 and 2.

The liquid crystal molecules used herein have a negative dielectric anisotropy and is low in viscosity.

The distance d between the substrates of the cell is selected to be thin. The distance between the substrates and the viscosity of the cell are selected so that the response time of the liquid crystal layer is shorter than the frame period of the excitation signal. When, for example, the frame frequency for an image is 60 Hz, the cell gap of 3 μm and the viscosity of 17 cps are selected.

Crossed linear polarizers 5 and 6 are disposed on opposite sides of the cell. One of the polarizers (for example, the polarizer 5 in the drawing) is disposed parallel to the π plane.

Figure 2A:
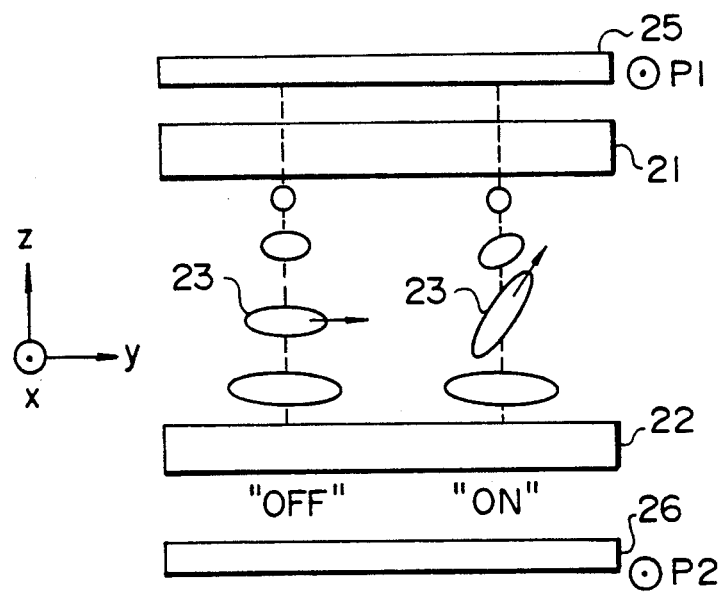
FIGS. 2A and 2B are schematic views for explaining the principles of operations of conventional twisted nematic type and conventional electrically controlled birefringence type liquid crystal displays.
Figure 2B:
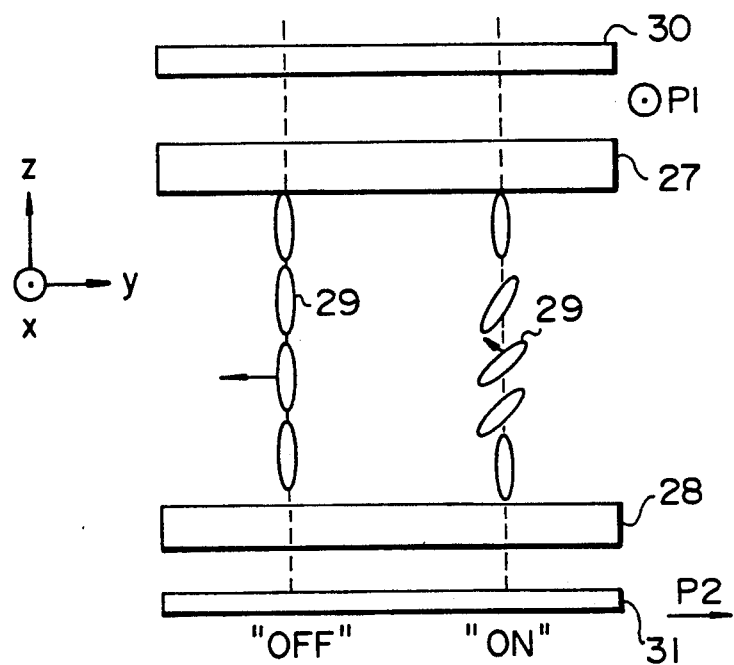

Accordingly, compared with the prior art technique as shown in FIG. 2B, the relationship between the polarization axis of the polarizer and the direction of the liquid crystal tilt angle is as follows.

| | Polarization axis and liquid crystal tilt angle direction |
|---|---|
| Prior Art | ±45° |
| Invention | 0° and 90° |

In the following, the behavior of the liquid crystal molecules is described.

In the "OFF" state, all the liquid crystal molecules 3 are oriented in the $\pi/2$ plane parallel to the polarization axis P1 of the polarizer 5. Normal incident light is not affected by the liquid crystal layer. Accordingly, the light transmitted through the liquid crystal layer is entirely absorbed by the second polarizer 6 having the polarization axis P2 perpendicularly crossing the axis P1.

The aforementioned property is always established regardless of the values of the surface tilt angle $\phi_S$ and the bulk tilt angle $\phi_B$. When a stabilizing signal is applied in the "OFF" time, the bulk tilt angle $\phi_B$ becomes larger than $\phi_S$. As described above, in the "OFF" time, the liquid crystal molecules are not separated from the $\pi/2$ plane, so that the cell looks black. In the "ON" state, the liquid crystal molecules 3 in bulk are departed from the $\pi/2$ plane. Accordingly, the liquid crystal cell acquires birefringence, so that all light normally incident on the cell cannot be absorbed by the second polarizer 6. Accordingly, the cell becomes transmissible.

In the following, a method of driving the liquid crystal display as described above is described.

"OFF" STATE

In the "OFF" state, a signal for stabilizing the non-twisted state is applied. Any suitable signal can be used for this purpose so long as the signal has a constant amplitude. It is preferable to make fluctuations of the amplitude of the signal as small as possible.

"ON" STATE

The "ON" state is obtained by application of a signal for inducing the twisted state. Any suitable voltage signal having at least one pulse having sufficient height and length to induce dynamic response in the liquid crystal molecules can be used for this purpose. The liquid crystal molecules 3 exhibit twisting by an angle $\theta$.

Figure 3A:
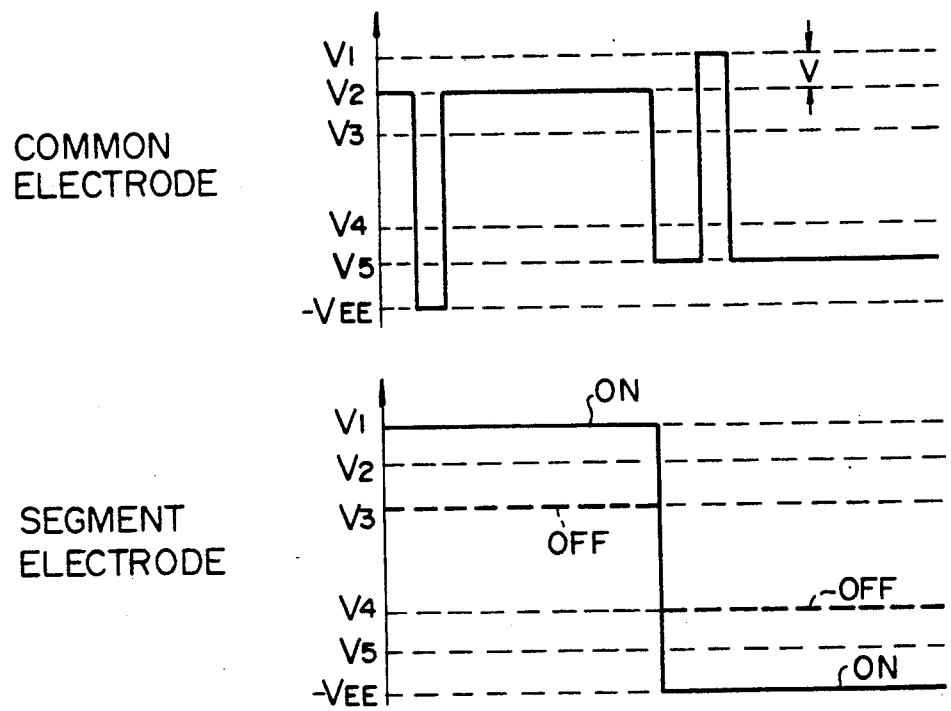
FIGS. 3A and 3B are graphs showing the waveforms of voltages applied to a common electrode and a segment electrode and the waveform of a voltage applied to a liquid crystal layer in the embodiment depicted in FIGS. 1A and 1B.

FIG. 3A shows voltage waveforms respectively applied to a common electrode and a segment electrode. The polarity of the impressed voltages shown in the left part of the figure is reverse to that of the impressed voltages shown in the right part of the figure. In the following, the left part of the figure will be described.

In the ordinary time, the common electrode is kept in a constant voltage $V_2$. At the selecting time, the common electrode is driven to a voltage $-V_{EE}$. In the "ON" time, the segment electrode is kept in a voltage $V_3$. the segment electrode is kept in a voltage $V_3$.

Figure 3B:
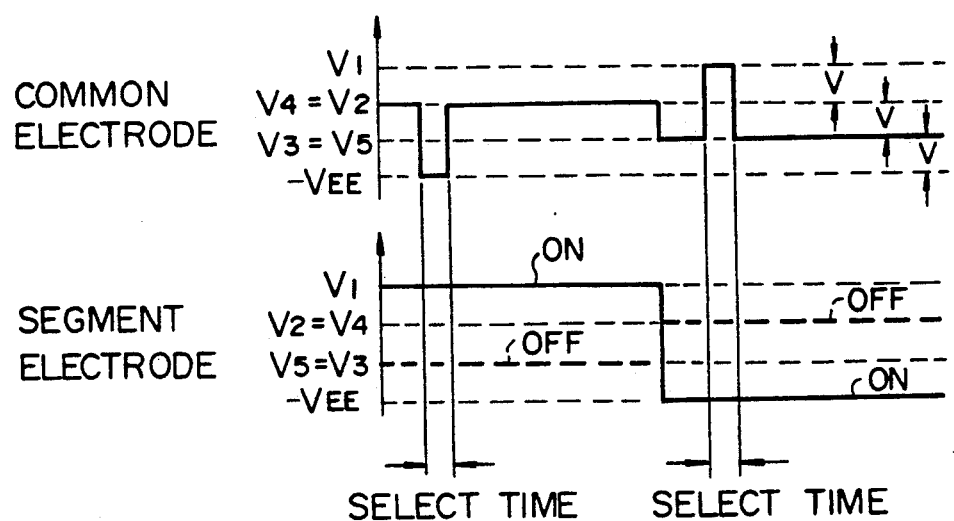

FIG. 3B shows waveforms of voltages in the specific case of $V_2-(-V_{EE})=V_2+V_{EE}=2$ V, $V_2=V_4$, and $V_3=V_5$. Four-level voltages are established so that the difference voltages between adjacent voltage levels are all 1 V. Although FIG. 3B is similar to FIG. 3A in that the voltage applied to the common electrode takes the values of $V_2$ and $-V_{EE}$, the difference between $V_2$ and $-V_{EE}$ in FIG. 3B is 2 V. Although FIG. 3B is also similar to FIG. 3A in that the voltage applied to the segment electrode takes the values of $V_1$ and $-V_{EE}$, the difference between $V_3$ and $-V_{EE}$ in FIG. 3B is 1 V. Accordingly, the left part and right right part of the waveform at the "OFF" time are inverted. As a whole, all voltages are accommodated in a smaller voltage region.

The period in which the voltage of the common electrode changes like a pulse is a selecting period.

Figure 3C:
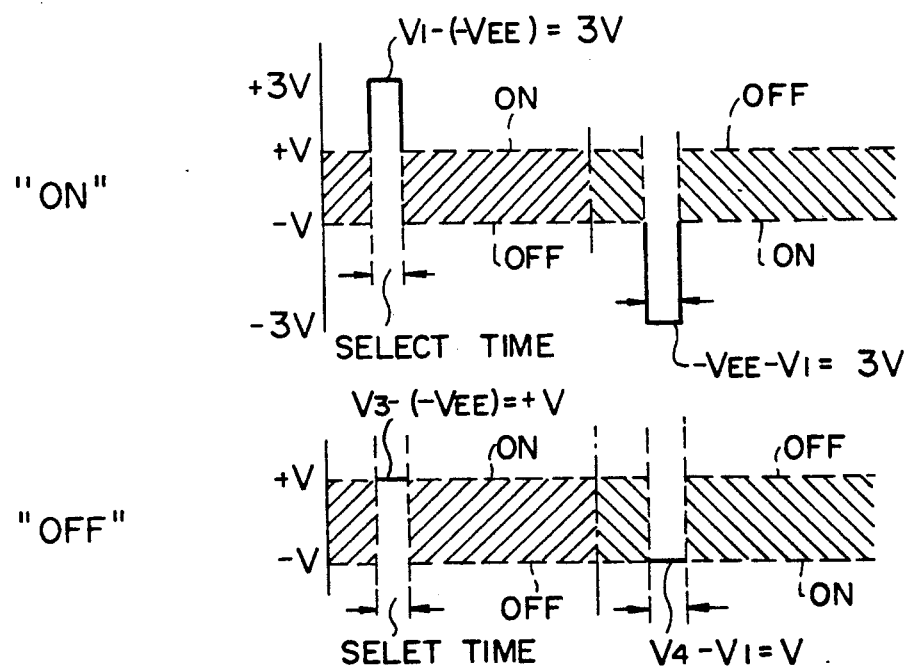
FIG. 3C is a graph showing the waveform of a voltage applied to a liquid crystal cell in the case where voltages are applied to the common electrode and the segment electrode of the liquid crystal display.

FIG. 3C shows a voltage applied to the liquid crystal cell while the aforementioned voltages are applied. In the selecting period at the "ON" time, the voltages of $-V_{EE}$ and $V_1$ are respectively applied to the common electrode and the segment electrode, so that the voltage of $V_1-(-V_{EE})=3$ V is applied to the liquid crystal cell. In the other periods at the "ON" time, the voltages of $V_2$ and $V_1$ are respectively applied to the common electrode and the segment electrode, so that the voltage of $V_1-V_2=V$ is applied to the liquid crystal cell. At the "OFF" time, the segment electrode takes the value of $V_3$. Accordingly, in the selecting period at the "OFF" time, the voltage of $V_3-(-V_{EE})=V_3+V_{EE}=+V$ is applied to the liquid crystal cell. In the other periods at the "OFF" time, the voltage of $V_3-V_2=-V$ is applied to the liquid crystal cell.

In the periods other than the selecting period, the segment electrode may be "ON" or "OFF". That is, the voltage applied to the segment electrode may be $+V$ or $-V$. The allowable region of the voltage is represented by hatched portion in the drawing.

As described above, according to the embodiment, spontaneous twisting is induced by application of a pulse voltage to a liquid crystal cell containing no chiral molecule or only a very small amount of chiral molecules, so that the "ON" state and the "OFF" state of the liquid crystal can be induced.

Although description has been made on preferred embodiments, the invention is not limited thereto. It will be apparent for those skilled in the art that various replacements, alterations, modifications, improvements and combinations thereof are possible.

What is claimed is:

1. A liquid crystal display apparatus having a common electrode and a segment electrode which are periodically driven at each driving frame time, comprising:
    a pair of substrates having tilt orientation directions parallel to each other and being capable of orientating liquid crystal molecules homeotropically or pseudo-homeotropically at an angle range of from 0° to about 20°; and
    a layer of nematic liquid crystal molecules disposed between said pair of substrates to form a cell having properties of negative dielectric anisotropy and containing substantially no chiral molecules, said cell having a response time shorter than the driving frame time,
    the tilt orientation directions of said substrates and said properties of said cell causing said liquid crystal layer to not be twisted in an "OFF" state and to be spontaneously twisted in an "ON" state in which a pulse voltage is applied between the common electrode and the segment electrode.

2. A liquid crystal display apparatus according to claim 1, further comprising:
    a first linear polarizer having a polarization direction parallel to the tilt orientation direction of one of said substrates; and a second linear polarizer having a polarization direction perpendicularly crossing the polarization direction of said first linear polarizer.

3. A liquid crystal display apparatus as defined in claim 2, further comprising means for applying a constant voltage signal between the common electrode and the segment electrode at the "OFF" state, and applying a voltage pulse signal between the common electrode and the segment electrode at the "ON" state.

4. A liquid crystal display apparatus as defined in claim 1, further comprising means for applying a constant voltage signal between the common electrode and the segment electrode at the "OFF" state, and applying a voltage pulse signal between the common electrode and the segment electrode at the "ON" state.

5. A liquid crystal display apparatus according to claim 1, wherein said pair of substrates are separated from each other by a predetermined distance and said cell has a predetermined viscosity, said distance and said viscosity being such that said response time of said liquid crystal layer is set based thereon to be shorter than said driving frame time.

6. A method of driving a crystal display apparatus having a common electrode and a segment electrode which are periodically driven at each driving frame time, said apparatus including: a pair of substrates having tilt orientation directions parallel to each other and being capable of orientating liquid crystal molecules homeotropically or pseudo-homeotropically at an angle range of from 0° to about 20°; and a layer of nematic liquid crystal molecules disposed between said pair of substrates to form a cell, having negative dielectric anisotropy and containing substantially no chiral molecules in which said cell has a response time shorter than the driving frame time, said liquid crystal layer not being twisted in an "OFF" state and being spontaneously twisted in an "ON" state, said method comprising the steps of:

applying a constant voltage signal between the common electrode and the segment electrode in the "OFF" state such that said liquid crystal layer is not twisted, and applying a voltage pulse signal between the common electrode and the segment electrode in the "ON" state such that the liquid crystal layer is spontaneously twisted.

7. A method of driving a crystal display apparatus according to claim 6, further comprising the steps of:

providing a first linear polarizer having a polarization direction parallel to the tilt orientation direction of one of said substrates; and providing a second linear polarizer having a polarization direction perpendicularly crossing the polarization direction of said first linear polarizer.

* * * * *